United States Patent [19]
Takahashi et al.

[11] 3,935,143
[45] Jan. 27, 1976

[54] ABS RESIN COMPOSITION

[75] Inventors: Sakae Takahashi; Shiro Saeki; Yoshio Onisawa, all of Sakai, Japan

[73] Assignee: Daicel Ltd., Osaka, Japan

[22] Filed: Apr. 16, 1973

[21] Appl. No.: 351,619

[30] Foreign Application Priority Data
Apr. 19, 1972  Japan.............................. 47-39364

[52] U.S. Cl.......... 260/23.7 R; 252/57; 260/45.8 R; 260/45.8 N
[51] Int. Cl.²......................................... C08L 91/00
[58] Field of Search ... 260/45.85 B, 45.8 R, 23.7 R, 260/45.8 N; 252/57

[56] References Cited
UNITED STATES PATENTS

| | | | |
|---|---|---|---|
| 3,285,855 | 11/1966 | Dexter................................. | 252/57 |
| 3,489,702 | 1/1970 | Abramoff........................ | 260/45.8 R |
| 3,542,573 | 11/1970 | Biland............................ | 260/45.8 R |
| 3,629,189 | 12/1971 | Minagawa...................... | 260/45.8 N |
| 3,743,614 | 7/1973 | Wolters......................... | 260/45.85 B |

*Primary Examiner*—M. J. Welsh
*Assistant Examiner*—W. E. Parker
*Attorney, Agent, or Firm*—Woodhams, Blanchard and Flynn

[57] ABSTRACT

An ABS resin composition is disclosed, adapted for rotational molding (rotocasting), which comprises an ABS resin of from minus 10 to plus 100 mesh size particles having uniformly dispersed and adhered to the surface of the particles an organic compound of a particle size of minus 100 mesh having a melting point of 100°C to 250°C and a decomposition point above 200°C, the weight ratio of resin to organic compound being 100 to 0.1 – 5.0.

7 Claims, No Drawings

ABS RESIN COMPOSITION

BACKGROUND OF THE INVENTION

Field of the Invention

This invention relates to an acrylonitrile/butadiene/styrene (ABS) resin composition having improved molding properties suitable for use in the rotational molding method that is currently receiving much commercial attention.

Recently, rotational molding, also called rotocasting, has attracted special interest as a practical molding method for manufacture of articles, particularly those made from polyethylene resins. This is in keeping with a trend of development of rotocasting as an economical and advantageous method of molding large-sized articles.

Rotocasting is generally applicable to the molding of thermoplastic resins, and is applicable to plastic materials in the form of power, grains or liquid. Commercial rotocasting devices are recommended by the manufacturers as applicable to the molding of ABS resin as well as polyethylene, polyvinyl chloride, polystyrene, nylon, cellulose butyrate and cellulose acetate.

However, the rotocasting method has a number of disadvantages, many of which apply particularly to the use of ABS resins.

Thus, resin powders prepared by conventional emulsion polymerization are too small in particle size for use in rotocasting. Hence such powders are usually heated to melt them, and are then formed into pellets, the size of which is regulated to be from about minus 10 to plus 100 mesh size. If granules of significantly larger size are used in the rotocasting process or if granules of significantly intricate shape are used, a part of the granules remain unmolten in the process, and a large mass is formed in the machine, resulting in a rough surface or an uneven thickness of the finished product. Also, when the process involves pouring the resin into small spaces such as the space between double walls, bridges tend to be formed making the molded product defective or otherwise unsatisfactory. Further, by comparison with products made of the same resin by other known resin molding methods such as injection, extrusion or blow molding, the products conventionally obtainable by rotocasting have significantly inferior mechanical strength.

ABS resin is known to possess such disadvantages as the foregoing. Heretofore the molding properties of this resin, when used in rotocasting, have been controlled mainly by regulating the particle size and particle shape, and partially by regulating the melt viscosity at the time of fusion of the composition per se. As yet these methods have not provided a fully satisfactory molding process for ABS resins. Conventionally the known shortcomings of the inferior molding properties of ABS resin have been partly compensated for by using molding techniques such as the use of a foaming agent, a technique which is not affected by the inherently poor rotational molding property of ABS resin.

BRIEF DESCRIPTION OF THE INVENTION

An object of this invention is to provide an ABS resin molding composition having remarkably improved molding and mechanical properties suitable for rotocasting.

Because the rotocast products obtained from ABS resin compositions according to this invention possess the intrinsic good mechanical properties of the ABS resin, the molded articles produced by the process of this invention can be used advantageously where rigidity and high impact strength are required such as in toys and structural components.

The present invention is accomplished by uniformly dispersing a predetermined quantity of an organic compound additive having a particular particle size and a particular melting point range onto the surface of the ABS resin particles which in turn have a particular particle size and are prepared by bulk-suspension two stage polymerization.

Particularly, this invention relates to an ABS resin composition adapted for rotational molding which comprises ABS resin particles of from 10 to 100 mesh size having uniformly dispersed on the surface thereof an organic compound additive of a particle size of less than 100 mesh, said additive having a melting point of 100° to 250°C and a thermal decomposition point above 200°C, the weight ratio of said resin to said additive being 100 : 0.1 to 5.0.

More particularly this invention relates to an ABS resin composition suitable for rotocasting, consisting essentially of (A) 100 parts by weight of ABS resin of from about minus 10 to plus 100 mesh particle size (Tyler Standard sieve) prepared by the bulk-suspension two stage polymerization method and (B) 0.1 to 5 parts by weight of an organic compound of a particle size of minus 100 mesh sieve, having a melting point in the range of 100°– 250°C and a decomposition ponit above 200°C, the latter (B) being uniformly dispersed and adhered onto the surface of the former (A). The composition can include, if desired, a dye or a pigment.

The inventors have found that the foregoing shortcomings can be more fully compensated for by uniformly dispersing 0.1 to 5.0 parts by weight of an organic additive compound of a particle size of minus 100 mesh Tyler Standard sieve, having a melting point in the range of 100° to 250°C and a decomposition point above 200°C on the surface of the ABS resin, whereby the mechanical properties of the molded product are improved remarkably. Thus the organic additive compound has a maximum dimension of less than about 0.147 mm.

The ABS resin used in the present invention is limited to acrylonitrile/butadiene/styrene copolymer obtained by the bulk-suspension two stage polymerization technique, and having 10-100 mesh grain size, that is particle sizes in the range of from about 1.6 to about 0.147 mm. The preferred particle shape is spherical or nearly spherical. ABS resins obtained by other generally known polymerization techniques are not comprehended by this invention. A suitable procedure for preparing ABS resin particles suitable for use in this invention is disclosed in U.S. Ser. No. 212,616, now U.S. Pat. No. 3,825,625. It will be understood that the ABS resin will normally consist of a mixture of ABS particles of different sizes within the range of 10 to 100 mesh.

As the ABS resin prepared by bulk-suspension polymerization to be used, especially preferred are ABS resin beads having such a viscosity that melt viscosity at a shear rate in the range of from $10^{-2}$ to 1 sec.$^{-1}$ at 240°C is below $1 \times 10^5$ poises and the ratio of melt viscosity at $10^{-2}$ sec.$^{-1}$ to that at 1 sec.$^{-1}$ is below 5.

Further details concerning this will be found in U.S. Ser. No. 262,218, now abandoned.

As the organic compound additive of a grain size which passes through 100 mesh sieve, having a melting point in the range of 100°–250°C and a decomposition point above 200°C, there can be mentioned metal salts of fatty acids generally used as lubricating agent in resins such as calcium stearate, barium stearate and zinc stearate; mono- and bis-amide compounds such as stearyl amide, palmityl amide, methylene bis stearyl amide, ethylene bis stearyl amide and alkylaryl bisamides; compounds generally used as antioxidants for resins such as 3-methyl-4-isopropylphenol, 2,5-di-tert. butylhydroquinone, 2′,2-methylene-bis-4-methyl-o-tert. butylphenol, 2,2-bis(4-hydroxyphenyl)propane tris(2-methyl-4-hydroxy-5-tert. butylphenol)butane, 1,3,5-trimethyl-2,4,6-tris(3,5-di-tert. butyl-4-hydroxybenzyl) benzene, tetrakis [methylene-3-(3,5-di-tert. butyl-4-hydroxyphenyl)propionate] methane; phenol compounds such as mono- and di-alkylidenebis-high molecular-hindered polyphenols; and 2-(2′-hydroxy-5′-methylphenyl)-benzotriazole used in resins as ultraviolet absorber.

If an organic compound having a melting point below 100°C is used, the purpose of the invention cannot be attained, because the compound per se is molten at the initial stage of the rotocasting to make the grain surface wet, thereby hindering seriously the uniform fluidity of the grains. Further, an organic compound having a melting point above 250°C cannot be molten even at the fusing temperature necessary for the formation of molten film of the resin, thereby reducing remarkably the mechanical properties of the resin. An organic compound which does not pass through 100 mesh sieve is difficultly dispersible or adherable to the surface of the resin grains, so that the purpose of the invention cannot be attained.

The additive organic compounds can be used alone or in the form of a mixture of two or more compounds in any ratio to attain the purpose of the present invention. Accordingly, there is no particular limitation in the selection of the organic compounds.

The amount of the organic additive compound incorporated for improving the rotational molding properties of the ABS resin and the mechanical properties of the resulting products is 0.1 to 5.0 parts by weight, preferably 0.2 to 3.0 parts by weight, per 100 parts by weight of ABS resin. When less than 0.1 part by weight of this additive is used, the molding properties cannot be improved and the mechanical strength of the resulting product also cannot be improved. Consequently, the purpose of the invention cannot be attained. When more than 5 parts by weight of the additive is used, the effect is not notable and the molding and physical properties tend to be reduced.

The present invention will be illustrated in more detail by the following examples which do not limit the invention. The compositions, physical properties of the resulting products and the molding properties in the following examples and comparative examples are summarized in Table 1.

The parts and percentages in the following examples are give by weight.

In the Table, the tensile impact strength is represented by kg.cm/cm$^2$ according to the tensile impact test described in ASTM D-1822.

The appearance of the product and the smoothness of the internal surface of the bridge between double walls were judged macroscopically. The evaluation was made on the basis of the following four standards:

1 : Superior,
2 : Excellent,
3 : Inferior,
4 : Extremely bad.

EXAMPLE 1

75 Parts (by weight, the same shall apply hereinafter) of ethylene monomer, 25 parts of acrylonitrile monomer, 13 parts of SBR rubber (copolymer of styrene/butadiene = 25/75), 0.15 part of benzoyl peroxide, 0.08 part of dicumyl peroxide, 0.35 part of t-dodecylmercaptan, 3 parts of butylbenzyl phthalate and 0.015 part of calcium stearate were mixed together, and the mixture was stirred until the rubber was dissolved completely. 10 Parts of deionized water were added to the mixture, and the whole was then heated to 72°C with stirring in a polymerization apparatus provided with a powerful stirring system for 5 hours to carry out the reaction until about 25 % of the monomers was converted to the polymer.

In a separate vessel, an aqueous phase comprising 100 parts of deionized water and 3 parts of magnesium hydroxide were prepared. The aqueous phase thus obtained was then added to said polymer mixture to obtain a suspension. The temperature of the suspension was raised from 65°C to 120°C over a period of about 1.5 hours. Stirring was effected at that temperature for about 5 hours to complete the polymerization.

Thereafter, the reaction mixture was cooled and the product was washed with hydrochloric acid and water, subjected to centrifugal dehydration and dried.

The resulting polymer was substantially spherical ABS resin particles 95% of which passed through a 32 mesh sieve.

100 Parts of the ABS resin were mixed with 1 parts of an alkylaryl bisamide of m.p. 170°–175°C having a grain size which passed through a 100 mesh sieve. The mixture was stirred in a spar mixer at 500 r.p.m. at ambient temperature for 3 minutes to disperse and coat the alkylarylbisamide uniformly on the surface of the ABS resin.

The thus obtained mixture was charged in a double wall rotary casting mold of a size of 500 mm × 450 mm × 250 mm (width) having 30 mm spacing between the two walls by using a McNeil type rotocasting machine. The mold was revolved about the equatorial axis of the mold at a rate of 10 r.p.m. and was simultaneously rotated about the polar axis of the mold at a rate of 8 r.p.m. while hot air at 350°C was circulated thereabout for about 20 minutes. The product was then cooled by spraying water on the external mold surface. After cooling sufficiently, the molded product was taken out. An excellent product of very favorable appearance, inside surface smoothness and a uniform thickness of about 3 mm was obtained as shown in Table 1. Bridging between the two walls was scarcely observed. A test piece cut from the product had a high tensile impact strength of 29 kg.cm/cm$^2$.

COMPARATIVE EXAMPLE 1

The same composition as in Example 1, but not containing alkylaryl bisamide, was subjected to the same molding operation as in Example 1. During the molding, the resin moved aside within the mold and a molded product of the desired shape was obtained with difficulty. A test piece cut from the product had a tensile impact strength of only 20 kg. cm/cm².

EXAMPLES 2–4 and Comparative Example 2

The compositions shown in Table 1 were molded in the same manner as in Example 1. With 0.1 to 5 parts of an alkylaryl bisamide added, the molding properties were quite excellent. The tensile impact strength of the molded product was improved highly by the addition of up to 5 parts of alkylaryl bisamide. The maximum tensile impact strength was observed when 10 parts of the additive were employed, but the other molding properties, other than appearance, became inferior when 10 parts of the additive was employed.

EXAMPLE 5

Molding was effected in the same manner as in Example 1 except that tetrakis[methylene-3-(3,5-di-tert. butyl-4-hydroxyphenyl)propionate]methane was used in place of the alkylaryl bisamide.

The product had quite excellent molding properties the same as that of Example 1 and a tensile impact strength of 28 kg.cm/cm² as shown in Table 1.

EXAMPLE 6

Molding was effected in the same manner as in Example 1 except that 2-(2'-hydroxy-5'-methylphenyl)-benzotriazol was used in placed of the alkylaryl bisamide to obtain the results as shown in Table 1 which were similar to those of Example 1.

COMPARATIVE EXAMPLE 3

Molding was effected in the same manner as in Example 1 except that 1 part of stearic acid of m.p. 64°–65°C was used, in place of the alkylaryl bisamide, and the results shown in Table 1 were obtained. Thus, substantially the same product and physical properties as in Comparative Example 1 were obtained.

COMPARATIVE EXAMPLE 4

Molding was effected in the same manner as in Example 1 except that perchloro-pentacyclodecane of m.p. 485°C was used, in place stearic acid used in Comparative Example 3. The product had a poor tensile impact strength of 15 kg.cm/cm², while the molding property thereof was relatively good.

COMPARATIVE EXAMPLE 5

Molding was effected in the same manner as in Example 1 except that the quantity of the alkylaryl bisamide was 0.05 part. The results were substantially the same as in Comparative Example 1.

Alkylaryl bisamides used in the Examples are origomers having molecular weights of 500 to 5,000 obtained by the condensation of xylene diamine and adipic acid or xylene diamine and sebacic acid.

As the organic compound additive of a grain size which passes through 100 mesh sieve, having a melting point in the range of 100°–250°C and a decomposition point above 200°C, compounds generally used as ingredients in the resin composition, such as antioxidants and other stabilizers, plastisizers, flame retarders and lubricants are preferably used. As examples of such compounds, the following compounds can be mentioned in addition to the compounds previously described in this specification:

Monophenols 2,6-di-tert.butyl-phenol
2,6-di-tert.butyl-4-methyl-phenol
2,6-di-tert.butyl-4-hydroxymethyl-phenol
2,6-di-tert.butyl-(α-dimethylamino)-p-cresol
2,4-di-methyl-6-tert.butyl-phenol
Styrenated phenol
mixture of α-methyl benzyl-phenols
akylated p-cresol
tri-tert.butyl-p-phenylphenol
2,4-di-tert.butyl phenyl 3,5-di-tert.butyl-4-hydroxy benzoate
4,4'-methylenebis(2,6-di-tert.-butyl phenol)

Lubricants

Barium laurate
Barium ricinolate
Calcium laurate

Flame retarders

Tetra-bromo-bisphenol A
1,2,3,4-tetrabromobutane

Ultraviolet absorbers resorcinol monobenzoate
2-hydroxy-4-methoxy-4'-methyl benzophenone
2-hydroxy-4-benzyloxy-benzophenone
2,4-dihydroxy-benzophenone
2,2',4,4'-tetra-hydroxy-benzophenone The above organic additives are effective in rotocasting only when they are dispersed or coated on ABS resin particles. In other words, the additive particles should be present in a state of being adhered or free on the surface of particles. If these additives are kneaded into the resin composition, they are not effective at all as exemplified in the following Example.

COMPARATIVE EXAMPLE 6

To 100 Parts of the ABS resin particles used in Example 1, 1 part of tetrakis [methylene-3-(3,5-di-tert.butyl-4-hydroxyphenyl)propionate] methane was added and kneaded into the polymer by extrusion obtain resin pellets. They were pulverized to particles of from 10 to 100 mesh size. The obtained resin composition was subjected to the same molding operation as in Example 1. However, the resin moved aside within the mold during the molding and a molded product of the desired shape could not be obtained.

The embodiments of the invention in which on exclusive property or privilege is claimed are defined as follows:

1. An acrylonitrile/butadiene/styrene molding composition adapted for rotational molding which consists essentially of (A) substantially spherical acrylonitrile/-butadiene/styrene resin particles of from 10 to 100 mesh size prepared by the bulk-suspension two stage polymerization process (e) said acrylonitrile/-butadiene/styrene resin particles having uniformly dispersed and coated only on the surfaces thereof (B) particles of an organic compound additive having a particle size of less than 100 mesh, said additive having a melting point of 100° to 250°C and a thermal decomposition point above 200°C, the weight ratio of (A) to (B) being 100 : 0.1 to 5.0, and said organic compound being selected from the group consisting of compatible lubricants, anti-oxidants, plasticizers, flame retardants, ultraviolet absorbing agents, and mixtures thereof.

2. The composition of claim 1, in which the additive compound is selected from the group consisting of calcium stearate barium stearate
zinc stearate
stearyl amide
palmityl amide
methylene bis stearyl amide
ethylene bis stearyl amide
alkylaryl bis amide
3-methyl-4-isopropylphenol
2,5-di-tert. butylhydroquinone
2',2-methylene-bis-4-methyl-o-tert. butylphenol
2,2-bis(4-hydroxyphenyl)propane
tris(2-methyl-4-hydroxy-5-tert. butylphenol) butane
1,3,5-trimethyl-2,4,6-tris(3,5-di-tert. butyl-4-hydroxybenzyl) benzene
tetrakis [methylene-3-(3,5-di-tert. butyl-4-hydroxyphenyl)propionate] methane
mono-alkylidenebis-high molecular-hindered polyphenols 2-(2'-hydroxy-5'-methylphenyl)-benzotriazole and mixtures thereof.

3. The composition of claim 1, in which the additive is an alkylaryl bisamide.

4. The composition of claim 1, in which the additive is tetrakis [methylene-3-(3,5-di-tert. butyl-4-hydroxyphenyl)propionate] methane.

5. The composition of claim 1, in which the additive is 2-(2'-hydroxy-5'-methylphenyl) benzotriazole.

6. A method which comprises; placing in a mold a charge of the composition as defined in claim 1; and then effecting rotational molding of said charge to form a molded product.

7. A method which comprises; placing in a mold a charge of the composition as defined in claim 2, and then effecting rotational molding of said charge to form a molded product.

* * * * *